Aug. 28, 1956 — L. M. NECHINE — 2,760,512
BY-PASS VALVE
Filed Aug. 1, 1951 — 3 Sheets-Sheet 2

Inventor,
Leonard M. Nechine
By: Schneider & Dressler, Attys

Aug. 28, 1956 — L. M. NECHINE — 2,760,512
BY-PASS VALVE
Filed Aug. 1, 1951 — 3 Sheets-Sheet 3
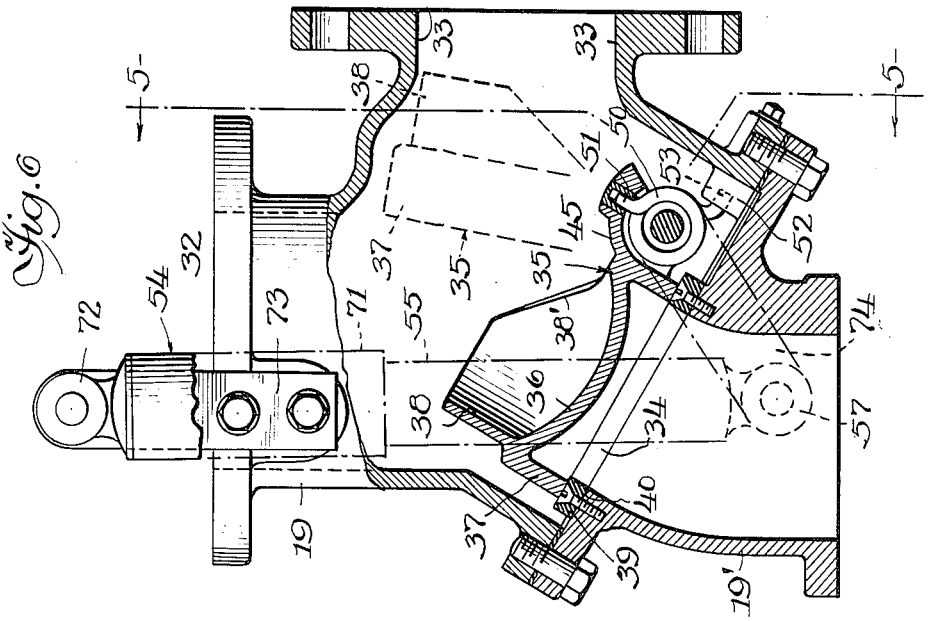
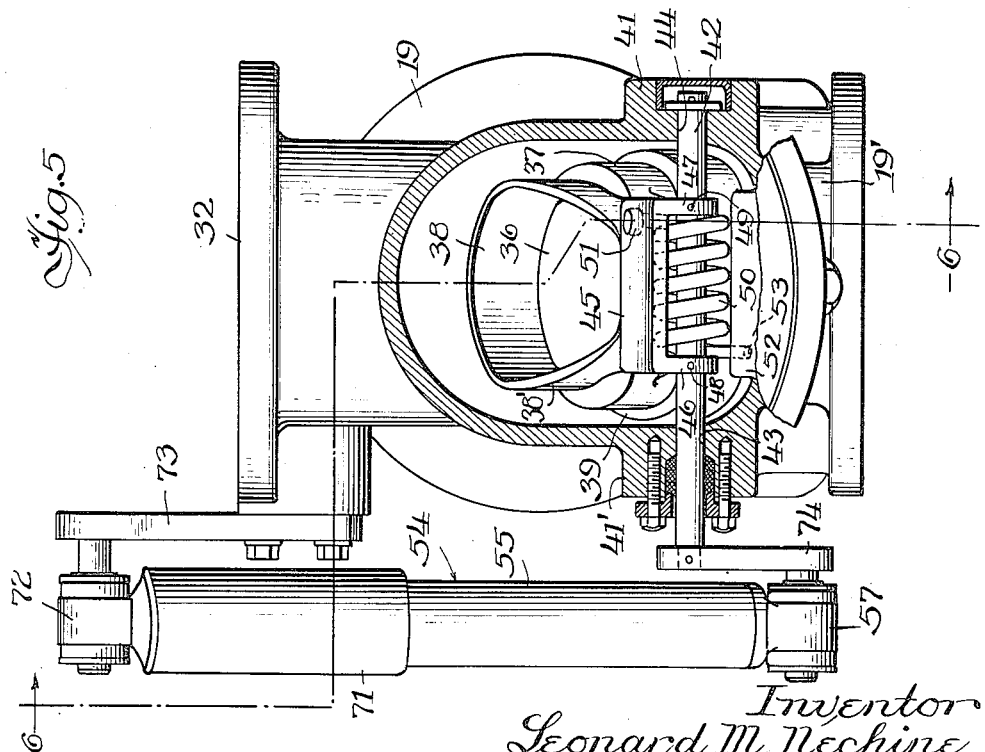
Inventor
Leonard M. Nechine
By: Schneider & Dressler,
Attys.

United States Patent Office 2,760,512
Patented Aug. 28, 1956

2,760,512

BY-PASS VALVE

Leonard M. Nechine, Highland Park, Ill., assignor to Chicago Pump Company, a corporation of Delaware Application August 1, 1951, Serial No. 239,745

8 Claims. (Cl. 137—107)

This invention relates to a by-pass valve, and is particularly concerned with a smooth-closing valve having means for preventing slamming of the valve in either opening or closing movements. Chattering and excessive wear and tear on the valve parts are eliminated.

The by-pass valve of the present invention may be used in any suitable environment, but is particularly adapted for use in connection with a pump for discharging sewage from a sewage basin. Portions of the same pipe system are used for inlet pipes to conduct the sewage to the basin, and for discharge pipes to carry the sewage out of the basin. The by-pass valve prevents incoming sewage from flowing through the pump which is idle when the sewage is flowing into the basin.

A serious disadvantage of pump by-pass valves previously used to effect this by-passing of inflowing liquid has been the excessive noise and water hammer incidental to the opening and closing of the valve. None of the valves previously known have been sufficiently positive in their operation. In accordance with the present invention, I have made an improvement in such by-pass valve mechanisms, including therein a valve provided with an upstanding flange adjacent its periphery so that the upper surface of the valve is engaged by liquid discharged from the pump continuously throughout its movement to closed position, thereby insuring positive and smooth closing of the valve when the pump starts to operate. The movement of the valve in each direction is damped by a dashpot. The flange structure and dashpot cooperate to prevent chattering.

The structure of the present invention by means of which the above and other advantages are attained will be described in detail in the following specification, taken in conjunction with the accompanying drawings, showing a preferred illustrative embodiment of the invention, in which:

Fig. 5 is a cross sectional view of the valve positioned in the fitting shown in Fig. 3, taken along line 5—5 of Fig. 6 and showing the valve in rear elevation; and Fig. 6 is a cross sectional view, taken substantially along the line 6—6 of Fig. 5.

Figure 1:
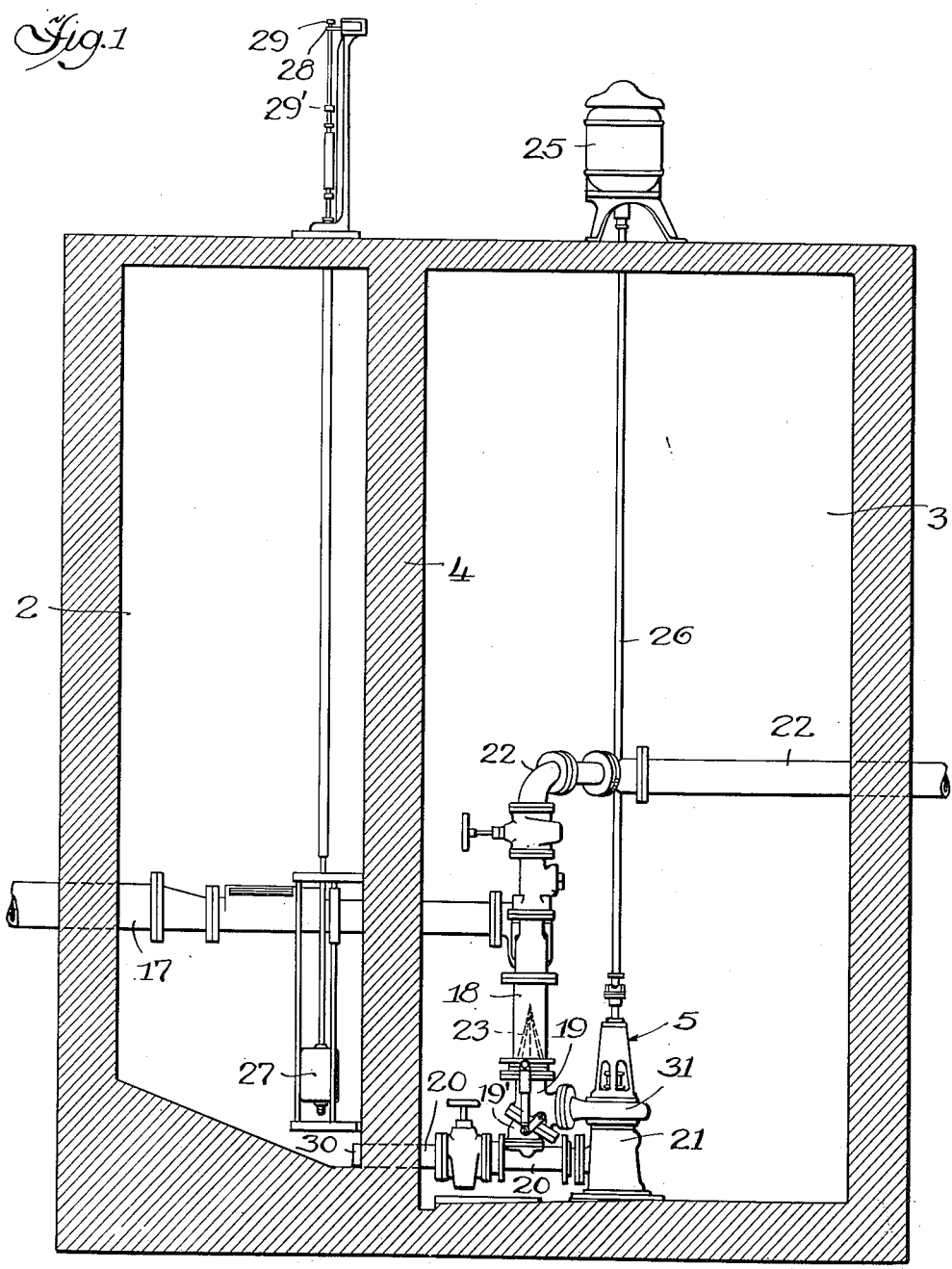
Figure 1 is a vertical sectional view of a sewage chamber, with the sewage pumping apparatus embodying the present invention shown in elevation.

In the drawings, the reference numeral 2 indicates a sump or basin separated from an adjacent compartment 3 by a vertical wall 4. The pumping apparatus, indicated generally by the reference numeral 5 is located in compartment 3, and the sewage to be pumped from the basin is delivered into basin 2 through inlet 17, pipe 18, fittings 19, 19′ and pipe 20. In the embodiment shown, all of these parts, except inlet 17, are in duplicate, and two centrifugal pumps 21 are shown. The pumps operate alternately, in the manner described in the patent to A. C. Durdin, Jr., No. 1,785,480, granted December 16, 1930, so that while sewage is being admitted through the pipes connected to one pump, the other pump is operating to pump the sewage through one discharge pipe 22, and when the sewage is being admitted through the pipes connected to the other pump, the first pump is operating to pump the sewage through the other discharge pipe 22, thus insuring continuous operation.

The lower portion of pipe 18, which is in communication with inlet 17 and with discharge pipe 22, is provided with a strainer 23. The strainer serves to intercept sewage solids contained in the liquid introduced through inlet 17 and thus prevents these solids from entering the basin 2 and, ultimately, the pump 21. A one-way check valve 24 in pipe 18 allows the sewage to pass to strainer 23. This valve is forced shut when the pump discharges liquid and thus insures that the pumped liquid will enter discharge pipe 22 only and be discharged therethrough.

Pump 21 is connected to an electric motor 25 through a shaft 26. A pair of float mechanisms 27 in basin 2 control the operation of each pump by trip switch 28 and buttons 29 and 29′ in the manner described in the above mentioned Durdin patent No. 1,785,480. The suction inlet of the pump is through pipe 20 which extends through wall 4 and has its mouth 30 positioned adjacent the bottom of basin 2. The pump discharges through a volute 31 which communicates with fitting 19, pipe 18, and discharge pipe 22. Conventional valves are provided in the various pipes to insure proper lines of travel for the sewage in each direction when either pump is being operated.

Fitting 19 has three openings 32, 33 and 34 communicating respectively with pipe 18, volute 31 and elbow 19′. Elbow 19′ communicates directly with pipe 20. A by-pass valve 35 is hinged in fitting 19 adjacent opening 34 and is adapted to control the flow of liquid through the fitting. The by-pass valve is in the form of a disc having a top wall 36 which bridges opening 34, an annular skirt 37, and an upstanding flange 38 positioned adjacent the periphery of said disc. Flange 38 terminates adjacent the rear edge of top wall 36, and the side wall portions slope downwardly, as indicated at 38′.

Elbow 19′ is positioned adjacent fitting 19. Elbow 19′ has an annular member 39 secured to edge 40. The annular member forms a valve seat upon which the skirt 37 seats. Top wall 36 is concave, and the concave portion is in the direct line of flow from the pump when the valve is in open position, as indicated in dotted lines in Fig. 6.

A pair of spaced lugs 41 and 41′ secured to fitting 19 adjacent one side of opening 34 supports a rod 42 rotatably mounted in aligned openings 43 and 44. A curved skirt 45 extending rearwardly from valve 35 is provided with ears 46 and 47 which encircle rod 42 and are pinned thereto, as indicated at 48 and 49, to form a hinge for the valve. A helical torsion spring 50, positioned between ears 46 and 47, also encircles rod 42. One end of spring 50 is seated in skirt 45, as indicated at 51, and the other end is seated in a lug 52 projecting inwardly from fitting 19, as indicated at 53. Spring 50 normally urges valve 35 towards open position. As seen by the dotted lines in Fig. 6, when valve 35 is in its open position it substantially closes opening 33 so that the sewage flowing into fitting 19 from pipe 18 flows through opening 34 into elbow 19′, through pipe 20 and into basin 2.

When pump 21 starts to operate it forces the sewage against the top of valve 35 and flange 38 causes enough of the liquid to be held against the top of the valve to force the valve into closed position against the action of spring 50. The check valve 24 is held closed so that the sewage being discharged by the pump flows through pipe 22. When the pump discharges enough sewage from basin 2 to lower float 27 far enough to cause button 29 to trip switch 28 the pump stops and spring 50 opens valve 35.

Figures 2, 3, 4:
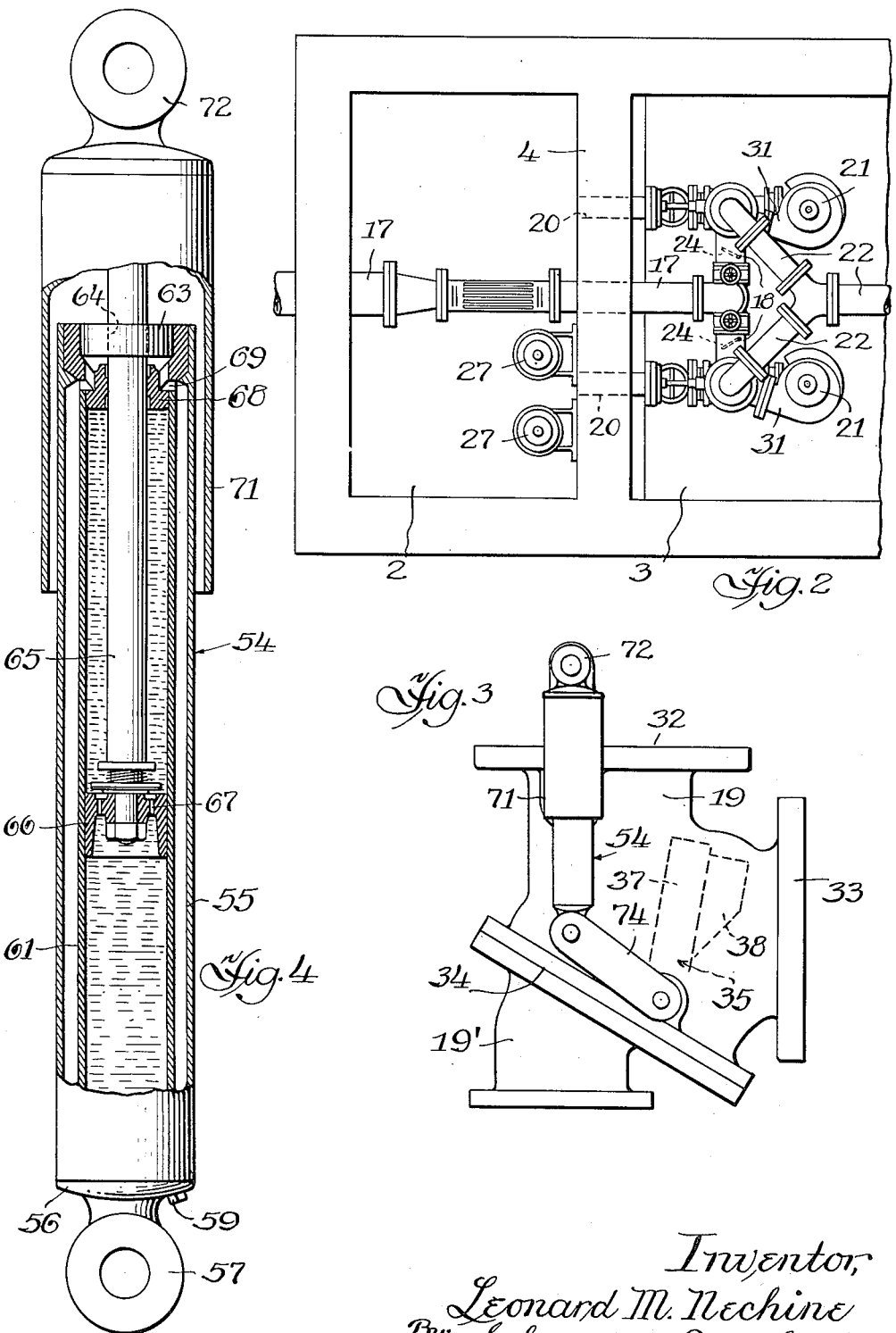
Fig. 2 is a top plan view of the sewage basin and pumping apparatus shown in Fig. 1.
Fig. 3 is a side elevational view of the fitting in which the valve embodying the invention is mounted.
Fig. 4 is an elevational view of the dashpot which is connected to the valve, portions thereof being shown in section.

To aid in preventing chattering and slamming of the valve 35, the movement of the valve in each direction is damped by shock absorbing means, such as a dashpot 54. The dashpot, shown in Fig. 4, contains an hydraulic fluid and is of conventional construction. It comprises a cylindrical casing 55 having one end closed by a cap 56. A ring 57 projects from the cap. An opening in the cap is closed by a plug 59. An inner cylindrical tube 61 contains the hydraulic fluid (preferably oil). The opposite end of casing 54 is closed by a plug 63 apertured, as indicated at 64, to receive a piston rod 65. A piston 66 has restricted openings 67 drilled therethrough. The piston is mounted on the end of rod 65 and fits snugly within tube 61. A packing 68 seals the space between the upper end of tube 61 and piston rod 65. Restricted passageways 69 are provided between the top edge of tube 61 and casing 54 so that if any oil moves past packing 68 it will flow to the bottom of the space between the tube 61 and casing 55.

A cap 71 secured to the upper end of rod 65 is provided with a ring 72. Ring 72 is connected to an arm 73 rigidly secured to fitting 19, and ring 57 is pivotally connected to an arm 74 pinned at its opposite end to rod 42. When valve 35 is moved towards open position, rod 42, which is rotated by such movement, pivotally moves arm 74 upwardly against the pressure of the oil contained in tube 61 above piston 66. This oil will be forced through passageways 67 to permit smooth upward movement of the casing 55 and tube 61. When pump 21 starts operating and valve 35 moves towards closed position the action of dashpot 54 is reversed, and the closing movement of the valve is also cushioned so that no slamming of the valve can occur in either direction.

In the operation of the apparatus, torsional spring 50 normally holds valve 35 open and the sewage or other liquid enters inlet 17 and passes through pipe 18 and strainer 23. The solid matter contained in the liquid is intercepted by the strainer and begins to accumulate around it. The strained liquid passes through opening 32 in fitting 19 and then flows through elbow 19' and pipe 20 into basin 2. As the liquid in the basin rises, float 27 rises until switch 28 is closed by button 29'. Pump 21 then starts operating. The liquid discharged by the pump strikes against the top 36 and flange 38 to force valve 35 to closed position. The closing action of valve 35 is resisted by torsional spring 50 and dashpot 54. When valve 35 is almost closed the liquid discharged from the pump would not strike the top 36 with sufficient force to effect a positive closing of the valve and chattering would take place. However, flange 38 increases the effective height of the valve so that the liquid discharged from the pump exerts sufficient force against the flange and the top of the valve to close the valve completely. The dashpot smoothes the movement of the valve so that there is no violent stop at the end of either its closing or opening movement. The liquid discharged from the pump passes through fitting 19 into pipe 18 and through strainer 23, carrying with it the solid matter accumulated therearound, and is discharged through discharge pipe 22. When the liquid in basin 2 reaches the predetermined low level, the switch is opened, the pump is stopped, and the former operation is repeated except that the other pump is operated when the switch is again closed.

Although I have described a preferred embodiment of my invention in considerable detail, it will be understood that the description thereof is intended to be illustrative, rather than restrictive, as many details may be modified or changed without departing from the spirit or scope of the invention. Accordingly, I do not desire to be restricted to the exact structure described.

I claim:

1. A valve comprising a disc having a hinge extension adjacent one portion of its periphery, spring means cooperating with said hinge extension to normally urge said disc towards open position, an upstanding flange adjacent the periphery of said disc, said flange extending around substantially all of said disc except the portion adjacent said hinge extension, said flange being adapted to intercept liquid flowing thereagainst and to retain sufficient liquid against the adjacent valve to close said valve against the force of said spring means, and shock absorbing means operatively connected to said valve to cushion the movement of said valve in each direction.

2. In combination with a fitting having a valve seat adjacent an opening therein, a valve pivotally mounted adjacent said seat, said valve comprising a disc having a depending annular skirt engageable with said valve seat to close said opening, spring means normally urging said valve towards opening position, and an upstanding rigid flange extending around a portion of said disc adjacent the periphery thereof and cooperating with said disc to form a liquid retaining member engageable, when said valve is open relative to said valve seat, by liquid flowing through said fitting in one direction and being adapted to retain enough of said liquid to facilitate closing of said valve against the action of said spring means.

3. In combination with a fitting having a valve seat adjacent an opening therein, a valve pivotally mounted adjacent said seat, said valve comprising a disc having a depending annular skirt engageable with said valve seat to close said opening, spring means normally urging said valve towards opening position, an upstanding flange extending around said disc adjacent the periphery thereof, said flange being engageable by liquid flowing through said fitting in one direction and being adapted to retain enough of said liquid to facilitate closing of said valve against the action of said spring means, and shock absorbing means operatively connected to said valve to cushion the movement of said valve in each direction.

4. In combination with a fitting having three openings, a valve seat adjacent one of said openings, a valve pivotally mounted adjacent said seat, said valve comprising a concave top wall, a rigid annular skirt depending from said top wall engageable with said seat to close said one opening, a hinge extension adjacent one portion of the periphery of said valve and an upstanding flange adjacent the periphery of said top wall, said flange extending at right angles to said top wall around substantially the entire top wall except the portion adjacent said hinge extension, and spring means cooperating with said hinge extension to normally urge said valve towards open position relative to said valve seat, said flange and said concave top cooperating to form a liquid retaining member capable of intercepting liquid flowing through the second of said openings towards the third opening, when said valve is open relative to said valve seat, said flange and concave top being adapted to retain enough of said liquid against the top of said valve to move said valve into engagement with its seat against the action of said spring means to close said first mentioned opening.

5. In combination with a fitting having three openings, a valve seat adjacent one of said openings, a valve pivotally mounted adjacent said seat, said valve comprising a concave top wall, an annular skirt depending from said top wall engageable with said seat to close said one opening, a hinge extension adjacent one portion of the periphery of said valve and an upstanding flange adjacent the periphery of said top wall, said flange extending around substantially the entire top wall except the portion adjacent said hinge extension, spring means cooperating with said hinge extension to normally urge said valve towards open position, said flange being adapted to cooperate with said concave top to intercept liquid flowing through another of said openings towards the third opening, said flange and concave top being adapted to retain enough of said liquid against the top of said valve to move said valve into engagement with its seat against the action of said spring means to close said first mentioned opening, and shock absorbing means operatively connected to said valve to cushion the movement of said valve in each direction.

6. In combination with a valve fitting having first and second communicating fluid passageways which join one another through orifices facing in substantially different directions, a valve arrangement for positively closing said orifice of said second passageway in response to a flow of fluid against same from the said orifice of said first passageway comprising a valve in the form of a disc pivotally mounted in said fitting for movement from a first position at least partially covering the said orifice of said first passageway to a second position completely covering the orifice of said second passageway, resilient means normally urging said valve disc in said first position, a rigid flange extending at right angles to said disc and surrounding an appreciable portion of the periphery of said disc opposite the axis of pivot thereof, said flange tapering to the level of the face of the disc in the vicinity where the disc is pivoted, said flange being located on the side of said disc which faces toward the orifice of said first passageway when said valve is in said first position and cooperating with said disc to form a liquid retaining member sufficiently deep to intercept and retain appreciable quantities of water flowing from the latter orifice even when said disc is in said second position, to positively close said second passageway.

7. In combination with a valve fitting having first and second communicating fluid passageways which join one another through orfices facing in substantially different directions, a valve arrangement for positively closing said orifice of said second passageway in response to a flow of fluid against same from the said orifice of said first passageway comprising a valve in the form of a disc pivotally mounted in said fitting for movement from a first position at least partially covering the said orifice of said first passageway to a second position completely covering the orifice of said second passageway, resilient means normally urging said valve disc in said first position, a flange surrounding an appreciable portion of the periphery of said disc opposite the axis of pivot thereof which tapers to the level of the face of the disc in the vicinity where the disc is pivoted, said flange being located on the side of said disc which faces toward the orifice of said first passageway when said valve is in said first position and being sufficiently deep to intercept and retain appreciable quantities of water flowing from the latter orifice even when said disc is in said second position, to positively close said second passageway, and shock absorbing means for cushioning the movement of said valve in both direction of movement thereof.

8. The combination of claim 6 wherein the side of said valve disc which faces said first passageway is concave.

References Cited in the file of this patent

UNITED STATES PATENTS

| | | |
|---|---|---|
| 293,328 | Jenkins | Feb. 12, 1884 |
| 982,400 | Walker | Jan. 24, 1911 |
| 1,113,282 | Anderson | Oct. 13, 1914 |
| 1,294,003 | Weaver | Feb. 11, 1919 |
| 1,346,887 | Heald | July 20, 1920 |
| 1,442,516 | Blake | Jan. 16, 1923 |
| 1,837,322 | Hamilton | Dec. 22, 1931 |
| 1,929,527 | Treverton | Oct. 10, 1933 |
| 2,049,976 | Riddell | Aug. 4, 1936 |
| 2,101,315 | Kemp | Dec. 7, 1937 |
| 2,161,813 | Groeniger | June 13, 1939 |
| 2,302,151 | Sloan et al. | Nov. 17, 1942 |
| 2,328,419 | Brown | Aug. 31, 1943 |
| 2,370,247 | Kenney | Feb. 27, 1945 |

FOREIGN PATENTS

| | | |
|---|---|---|
| 706,982 | France | Apr. 4, 1931 |